United States Patent Office 3,567,709
Patented Mar. 2, 1971

3,567,709
METHOD OF PREPARING THE SODIUM SALT OF 6 - (5 - METHYL - 3 - PHENYL - 4 - ISOXA-ZOLECARBOXAMIDO)-PENICILLANIC ACID MONOHYDRATE
Marina Alexeevna Panina, Ul. Gorkogo 4, kv. 59; Valentina Alexandrovna Averianova, Pulkovskaya ul. 11, korp. 3, kv. 310; and Ivan Timofeevich Strukov, Balaklavsky prosp. 20, korp. 3, kv. 209, all of Moscow, U.S.S.R.
No Drawing. Filed Dec. 21, 1967, Ser. No. 692,330
Int. Cl. C07d 99/16
U.S. Cl. 260—239.1         4 Claims

ABSTRACT OF THE DISCLOSURE

A method of producing the sodium salt of 6-(5-methyl-3-phenyl - 4 - isoxazolecarboxamido)-penicillanic acid monohydrate by the acylation of 6-aminopenicillanic acid with 5 - methyl - 3 - phenylisoxazole - 4 carbonyl chloride in aqueous acetone solution and in the presence of sodium bicarbonate. The resultant sodium salt of 6-(5-methyl - 3 - phenyl - 4 - isoxazolecarboxamido)-penicillanic acid is converted into the free acid by acidifying the reaction mixture to a pH of 2.5–3, the acid thus obtained is extracted with butyl acetate, and the solution of 6-(5-methyl - 3 - phenyl - 4 - isoxazolecarboxamido)-penicillanic acid is treated with an equimolecular amount of sodium hydroxide in alcoholic solution.

The present invention relates to methods of preparing the sodium salt of 6-(5-methyl - 3 - phenyl - 4 - isoxazolecarboxamido)-penicillanic acid monohydrate (oxacillin), a semi-synthetic penicillin employed in medicine.

A method of preparing the sodium salt of 6-(5-methyl-3-phenyl - 4 - isoxazolecarboxamido)-penicillanic acid monohydrate (oxacillin) is known. In this method, after the acylation of 6-amino-penicillanic acid with 5-methyl-3-phenylisoxazole - 4 - carbonyl chloride in aqueous-acetone solution in the presence of sodium bicarbonate, the reaction mixture is acidified with N hydrochloric acid and the free 6-(5-methyl - 3 - phenyl - 4 - isoxazolecarboxamido)-penicillanic acid is extracted with ether and the sodium salt of 6-(5-methyl - 3 - phenyl - 4 - isoxazolecarboxamido)-penicillanic acid is then re-extracted with an aqueous solution of sodium bicarbonate, the extract is evaporated in vacuo, and the product is obtained in the form of a powder.

Disadvantages of said method are the use of fire- and explosion-hazardous ether as solvent and the employment of lyophilic drying of the product.

It is an object of the present invention to eliminate said disadvantages.

It is a further and more specific object of the invention to provide a simplified method of preparing the crystalline sodium salt of 6-(5-methyl - 3 - phenyl - 4 - isoxazolecarboxamido)-penicillanic acid monohydrate, said method being free from explosion hazard and giving a product of high quality.

These objects have been achieved by the provision of a method of preparing the sodium salt of 6-(5-methyl-3-phenyl - 4 - isoxazolecarboxamido)-penicillanic acid monohydrate by acylation of 6 - aminopenicillanic acid with 5 - methyl - 3 - phenylisoxazole - 4 - carbonyl chloride in an aqueous acetone solution in the presence of sodium bicarbonate with subsequent extraction of the 6-(5-methyl - 3 - phenyl - 4 - isoxazolecarboxamido)-penicillanic acid thus formed with butyl acetate, the butyl acetate solution of 6-(5-methyl - 3 - phenyl - 4 - isoxazolecarboxamido)-penicillanic acid then being treated, according to the invention, with an equimolecular amount of sodium hydroxide in alcoholic solution.

The process of the present invention can be embodied as follows:
6-aminopenicillanic acid is acylated with 5-methyl-3-phenylisoxazole - 4 - carbonyl chloride in aqueous acetone solution in the presence of sodium bicarbonate. 6-(5-methyl - 3 - phenyl - 4 - isoxazolecarboxamido)-penicillanic acid is extracted with butyl acetate at a pH of 3.0–2.5, the solution is dried and treated with sodium hydroxide in solution in a normal aliphatic alcohol.

Employment of the present invention makes it possible to obtain a high quality product containing not less than 95% of active substance, while simplifying the production process.

For a better understanding of the present invention by those skilled in the art, the following examples are given by way of illustration.

EXAMPLE 1

To 158 ml. water and 42 ml. acetone are added with stirring 6.23 g. 6-aminopenicillanic acid and 6.3 g. sodium bicarbonate. The solution is cooled to 2–5° C. and to it, there is added, with stirring over a period of 15 min., a solution of 6.39 g. 5 - methyl - 3 - phenylisoxazole-4-carbonyl chloride in 38 ml. acetone. The reaction mixture is stirred 2 hours at room temperature and washed 3 times with 60 ml. portions of butyl acetate. The aqueous phase is separated and extracted with 100 ml. of butyl acetate, the pH being adjusted to 3.0–2.5 with 10% sulphuric acid.

Extraction is repeated with 50 ml. of butyl acetate at the same pH, and the combined organic extracts washed with water, dried with magnesium sulphate, and after removal of the drying agent, is treated with 22.9 ml. of a 5% sodium hydroxide solution in n-butanol. The temperature of the reaction mixture should not exceed 0+2° C. After the appearance of a precipitate stirring is stopped and the reaction mixture held at 0+5° C. for 3 hours. The precipitate is removed, washed successively with butyl acetate and acetone and dried for 1.5 hours at 60° C. and 5 mm. Hg. The weight of the finished product is 8.45 g., assaying 98.5%. The yield is 63% on the basis of the 6-aminopenicillanic acid.

EXAMPLE 2

A solution of 29.8 g. 5-methyl - 3 - phenylisoxazole-4-carbonyl chloride in 177 ml. acetone is added with stirring over a period of 15 min. to a solution of 29.0 g. 6-aminopenicillanic acid and 29.4 g. sodium bicarbonate in 737 ml. water and 198 ml. acetone, said solution having been cooled to 2+5° C.

The mixture is stirred 2 hours at room temperature and extracted 3 times with 170 ml. portions of butyl acetate. The aqueous phase is separated and extracted with 150 ml. butyl acetate, the pH being adjusted to 3.0–2.5 with 100 ml. 10% sulphuric acid. Extraction is repeated with 100 ml. butyl acetate at the same pH.

The combined butyl acetate extract is washed with water, dried with magnesium sulphate, the drying agent is filtered out, and the extract treated with a solution of 5.03 g. of sodium hydroxide in 49 ml. methanol. The temperature of the reaction mixture should not exceed 0+2° C. After the appearance of a precipitate stirring is stopped and the reaction mixture is held for 3 hours at 5° C. The precipitate is separated, washed with butyl acetate followed by acetone and dried 1.5 hours at 60° C. and 5 mm. Hg. The weight of the product is 36.2 g. assaying 98.4%. The yield is 61% on the basis of the 6-aminopenicillanic acid.

EXAMPLE 3

A solution of 28.9 g. 5-methyl-3-phenylisoxazole-4-carbonyl chloride in 173 ml. acetone is added in portions to a stirred solution of 28.1 g. 6-aminopenicillanic acid and 28.5 sodium bicarbonate in 712 ml. water and 192 ml. acetone, said solution being cooled to 5° C. The mixture is stirred 2 hours at room temperature and then extracted with two 150 ml. portions of butyl acetate. The aqueous phase is separated and extracted with 200 ml. butyl acetate, the pH of the aqueous phase being lowered to 2.5 with 87 ml. 10% sulphuric acid. Extraction is repeated with 100 ml. of butyl acetate at the same pH. The combined butyl acetate extract is washed with water and dried with magnesium sulphate. After removal of the drying agent the extract is cooled to 0–2° C. and a solution of 5.6 g. sodium hydroxide in 87.2 ml. ethanol added. After 30 min. a precipitate appears; stirring is continued for 30 min., after which the reaction mixture is held for 3 hours at 5° C. The precipitate is removed, washed successively with butyl acetate and dry acetone, and dried for 1.5 hours at 60° C. and 5 mm. Hg.

There are obtained 45.3 g. crystalline, colourless oxacillin assaying 98.7%. Yield 67% of theory on the basis of the 6-aminopenicillanic acid.

What we claim is:

1. A method of preparing the sodium salt of 6-(5-methyl - 3 - phenyl - 4 - isoxazolecarboxamido)-penicillanic acid monohydrate by acylating 6-aminopenicillanic acid with 5-methyl - 3 - phenyl- isoxazole - 4 - carbonyl chloride in aqueous acetone solution in the presence of sodium bicarbonate and converting the resulting sodium salt of 6-(5-methyl - 3 - phenyl-4-isoxazolecarboxamido)-penicillanic acid in an acidic medium to 6-(5-methyl-3-phenyl - 4 - isoxazolecarboxamido)-penicillanic acid, wherein said acid is extracted with butyl acetate and the solution of 6-(5-methyl - 3 - phenyl - 4 - isoxazolecarboxamido)-penicillanic acid is treated with an equimolecular amount of sodium hydroxide in alcoholic solution.

2. A method according to claim 1 wherein the extraction of 6-(5-methyl - 3 - phenyl - 4 - isoxazolecarboxamido)-penicillanic acid with butyl acetate is carried out at a pH of 2.5–3.

3. A method according to claim 1 wherein the solution of 6-(5-methyl - 3 - phenyl - 4 - isoxazolecarboxamido)-penicillanic acid is dried prior to treating said solution with alcoholic sodium hydroxide.

4. A method according to claim 1 wherein the alcoholic sodium hydroxide solution is a sodium hydroxide solution of n-butanol, ethanol, or methanol.

References Cited

UNITED STATES PATENTS 2,996,501    8/1961    Doyle et al. _____ 260—239.1

NICHOLAS S. RIZZO, Primary Examiner